US008769429B2

(12) United States Patent
Refuah et al.

(10) Patent No.: US 8,769,429 B2
(45) Date of Patent: Jul. 1, 2014

(54) METHOD AND SYSTEM FOR PROVIDING ENHANCED USER INTERFACES FOR WEB BROWSING (75) Inventors: Aviv Refuah, Tel Aviv (IL); Limor Gemer, Kfar Mordechai (IL)

(73) Assignee: Net-Express, Ltd., Hod-Hasharon (IL)

( * ) Notice: Subject to any disclaimer, the term of this patent is extended or adjusted under 35 U.S.C. 154(b) by 787 days.

(21) Appl. No.: 12/873,237

(22) Filed: Aug. 31, 2010

(65) Prior Publication Data

US 2012/0054669 A1 Mar. 1, 2012

(51) Int. Cl.
*G06F 3/048* (2013.01)
(52) U.S. Cl.
USPC .......................................................... 715/783
(58) Field of Classification Search
USPC .......................................................... 715/783
See application file for complete search history.

(56) References Cited

U.S. PATENT DOCUMENTS

| 6,567,103 | B1 | 5/2003 | Chaudhry |
| 6,643,641 | B1 | 11/2003 | Snyder |
| 6,683,629 | B1 | 1/2004 | Friskel |
| 7,036,074 | B1 | 4/2006 | Ohta |
| 8,185,825 | B2 * | 5/2012 | Chandley et al. ............ 715/738 |
| 8,239,377 | B2 * | 8/2012 | Milic-Frayling et al. ..... 707/722 |
| 2003/0093409 | A1 | 5/2003 | Weil |
| 2005/0154723 | A1 | 7/2005 | Liang |
| 2006/0184515 | A1 | 8/2006 | Goel |
| 2006/0242553 | A1 | 10/2006 | Kulas |
| 2006/0294476 | A1 * | 12/2006 | Buckley ......................... 715/781 |
| 2007/0043706 | A1 | 2/2007 | Burke |
| 2007/0073713 | A1 | 3/2007 | Thomas |
| 2007/0276811 | A1 | 11/2007 | Rosen |
| 2007/0299830 | A1 | 12/2007 | Muenchhoff |
| 2008/0134093 | A1 | 6/2008 | Dharmarajan |
| 2009/0006389 | A1 | 1/2009 | Piscitello |
| 2009/0007167 | A1 * | 1/2009 | Artom ............................. 725/9 |
| 2009/0249229 | A1 * | 10/2009 | Offer ............................ 715/760 |
| 2010/0131902 | A1 | 5/2010 | Teran |
| 2010/0161586 | A1 | 6/2010 | Safar |
| 2010/0306237 | A1 * | 12/2010 | Chandley et al. ............. 707/769 |

\* cited by examiner

*Primary Examiner* — Omar Abdul-Ali
(74) *Attorney, Agent, or Firm* — Ostrager Chong Flaherty & Broitman P.C.

(57) ABSTRACT

Computer-implemented systems and methods are disclosed which provide user interfaces for enhanced web browsing. The systems and methods monitor a user's web browsing activity, determine times at which the user is likely to desire web browsing assistance, and provide additional content deemed relevant to the user's web browsing activities. In one embodiment, the system detects that a user is requesting search results from a third party search engine. The system determines content to provide alongside the search results the user receives, and displays that content to the user. The content preferably is hyperlinks to some of the most popular websites on the internet. In another embodiment, the system detects that a user is browsing to a very popular website. The system determines popular websites that are related to the website the user is viewing and presents those websites to the user. In a third embodiment, the system receives a search query directly from the user and provides popular websites deemed relevant to the user's browsing activities.

20 Claims, 8 Drawing Sheets

METHOD AND SYSTEM FOR PROVIDING ENHANCED USER INTERFACES FOR WEB BROWSING

TECHNICAL FIELD

The present disclosure relates generally to methods and systems for providing assistance to internet users who are viewing websites, and more particularly to systems and methods for displaying content relevant to a user's browsing activities, such as additional relevant search results or hyperlinks to sites considered relevant to web browsing activities.

BACKGROUND

Users browsing the internet generally view one web page at a time. To browse between websites, a user can generally do one of the following: remember and enter the URL in the web browser, go to a search engine, type in a search query, and click on one of the links that appears, click on a hyperlink on a page they are currently viewing, or retrieve a web page from a bookmark they have previously entered. Each of these methods has their drawbacks.

For entry of a URL into the URL bar of a web browser, an exact URL must be remembered. If a user forgets the URL, which can be quite long, this method cannot be used. For browsing based on use of a search engine, the user need not remember the exact URL. However, leaving the current page, browsing to a search engine, entering the query, and selecting the appropriate link takes time and can inconvenience the user.

To browse to a webpage using a hyperlink, the webpage a user is currently viewing must contain such a hyperlink. Thus, while this is a quick method to browse to another page, the number of pages which can be browsed to is usually very limited. Finally, for bookmarks, the user must have previously bookmarked that page.

A wide variety of tools are presently available to assist the user in quickly browsing to a desired web page, and to provide additional relevant content to a user, but each has their drawbacks.

For example, search tools exist which allow users to enter a search query without needing to browse to a search engine's web page. Tools such as various search engines' toolbars (e.g. Google Toolbar, Yahoo! Toolbar, Bing Bar, and others) are permanently displayed in web browser programs and provide a location for a user to type in a search query. More recently, such functionality has been built into web browsers themselves, and searches can even be performed from the URL bar of a web browser. These tools provide quick access to individual search engines, but have their own drawbacks. For example, they are not context sensitive, and will remain visible to a user regardless of what page the user is viewing. Additionally, they are generally limited in functionality in that they will only provide search results from a single specific search engine.

To provide additional relevant content, some search engines such as Google will allow a user to request specific types of hyperlinks, such as links to images, videos, maps, and the like. Some search engines will also provide suggested search queries, or will allow a user to determine the source from which search results are drawn, but will not provide specific links determined to be highly relevant to a search query (aside from the search results). Further, these items must generally be manually accessed and will not appear automatically when it is determined that a user would be likely to require such assistance.

What is needed, therefore, is a computer implemented method for providing access to content which helps a user to quickly browse to websites which are relevant to the user's current browsing activities.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

It is an object of the present invention to supplement current search engines and web browsers by determining when a user is likely to want to view content relevant to their browsing activities.

It is an object to quickly provide a user browsing the internet with the ability to view content that is relevant to their current browsing activities.

It is an object to allow a user to quickly assess such content by providing graphical display elements which organize the content in a useful manner.

It is an object to allow a user to quickly assess such content by providing graphical previews of websites, thereby allowing the user to quickly visually compare and evaluate the contents of such websites.

It is an object to provide hyperlinks to a number of websites that are most relevant to a user's current browsing activities.

It is an object to provide other functionality relevant to a user's browsing activities, such as search, advertisement, multimedia content, and content from third-party websites, among other things.

It is an object to be unobtrusive and allow a user to browse the internet uninterrupted when it is determined that the user likely does not need access to related content.

In accordance with these objects, methods and systems are disclosed which monitor a computer user's web browsing activities and provide useful hyperlinks to internet content deemed relevant to those browsing activities. The system can be implemented over various devices connected through the internet or within another type of network such as a LAN, intranet, or the like. The system will display relevant content, such as hyperlinks, only when certain conditions ("triggers") are met, and will otherwise remain partially or completely invisible to a user. These triggers preferably coincide with times at which a user is most likely to want quick shortcuts to various related web pages. Triggers will be enumerated and described in detail below, but generally include events such as a user entering a recognized search query into a third party search engine, browsing to a recognized web page, or requesting search results directly from the system.

Upon being triggered, the inventive system may display various graphical elements on a user's screen to help present information to a user in a convenient way. One such graphical element is a "slider", which is a frame that appears on the user's screen and contains information provided by the system. The slider can incorporate many different graphical and functional elements, such as website screenshot windows, search bars, lists of categories, and list index boxes, all described below.

A system and method is therefore disclosed which assists in providing a user with links to content relevant to the user's browsing activities.

For example, in a first embodiment, a user submitting a search query to a third-party search engine, such as Google will be detected. The query will be determined, and hyperlinks will be provided which are relevant to the user's search query. The hyperlinks provided will preferably be a list of very popular websites. Thus a user will be able to view the search results from the third-party search engine, alongside the websites provided by the system.

In a second embodiment, relevant hyperlinks will be provided while a user is viewing a popular page. To do this, a user's web browsing activities are monitored. When a user accesses a recognized website, hyperlinks to popular, related websites will be provided.

In a third embodiment, a user submits a search query directly to the system. The system will provide search results responsive to that query, and will provide graphical display elements which assist in browsing through those results. These graphical elements may include a list of categories, which allow a user to browser through related categories of websites, and features to assist in browsing through the categories, such as pop-up windows which are presented when a user mouses over a category, and which display sub-categories, and tabs which allow browsing through sub-categories and super-categories.

A computer-implemented process for displaying content relevant to a user's browsing activities is provided, comprising: accepting a search term input; comparing the search term to a database of search terms; if there is a match between the search term and the database of search terms, determining a list of relevant websites; displaying a window frame in a main program window; displaying a series of website screenshot windows within said window frame, each of said website screenshot windows having a website screenshot, said series of website screenshot windows displaying websites in the list of relevant websites in order of popularity.

A second computer-implemented process for displaying content relevant to a user's browsing activities is provided, comprising: accepting a URL of a currently viewed website; comparing the URL to a database of popular websites; if there is a match between the URL and the database of popular websites, determining a list of relevant websites; displaying a window frame in the main program window; displaying a series of website screenshot windows within said window frame, each of said website screenshot windows having a website screenshot, a rank number indicator, a website title and a category bar, said series of website screenshot windows displaying websites in the list of relevant websites in order of popularity.

A third computer-implemented process for displaying content relevant to a user's browsing activities is provided, comprising: accepting a search query; comparing the search query to a database of search terms; if a match exists, determining a list of websites for the search query, and if no match exists between the search query and the database of search terms, requesting search results from a third-party search engine; displaying the list of websites or the search results from the third-party search engine in a main screen window of a browser; displaying a window frame in the main screen window; and displaying a list of categories within the window frame.

A web browser operable on a computer of a user connected to the Internet is provided, comprising: a web browser add-on integrated with said web browser for monitoring web browsing activities of a user and providing said user with content relevant to said web browsing activities; wherein said add-on is operative to capture the URL address of the web page a user is currently viewing, to determine content relevant to said URL address, and to display said relevant content to the user in a non-obtrusive manner.

A system for providing relevant content to a user browsing the internet is also provided, said system comprising: one or more servers capable of connecting to a user computer through an internet connection; said one or more servers possessing at least one database storing popular internet content; said one or more servers programmed to receive a query for relevant content; said one or more servers programmed to produce relevant content in response to said query, thereby causing a user computer to display said relevant content within a web browser window.

A fourth computer-implemented process for displaying content relevant to a user's browsing activities is provided, comprising: accepting a search term input; sending the search term to a server for comparison to a database of search terms; receiving a response to said sending, wherein said response comprises a list of relevant websites if there is a match between the search term and the database of search terms; displaying a window frame in a main program window; displaying a series of website screenshot windows within said window frame, each of said website screenshot windows having a website screenshot, said series of website screenshot windows displaying websites in the list of relevant websites in order of popularity.

A fifth computer-implemented process for displaying content relevant to a user's browsing activities is provided, comprising: receiving a search term input; comparing said search term input to a database of search terms; sending a response to said search term input, wherein said response comprises a list of relevant websites if there is a match between the search term and the database of search terms; thereby causing the user's computer to display a window frame in a main program window and to display a series of website screenshot windows within said window frame, each of said website screenshot windows having a website screenshot, said series of website screenshot windows displaying websites in the list of relevant websites in order of popularity.

A process for displaying content relevant to a user's browsing activities is provided, comprising: providing a web browser add-on operable on the user's computer having functionality for determining a search term input from a browser on the user's computer; comparing said search term input to a database of search terms; sending a response to said search term input to the user's computer, wherein said response comprises a list of relevant websites if there is a match between the search term and the database of search terms; thereby causing the user's computer to display a window frame in a main program window and to display a series of website screenshot windows within said window frame, each of said website screenshot windows having a website screenshot, said series of website screenshot windows displaying websites in the list of relevant websites in order of popularity.

These general and specific aspects may be implemented using a system, a method, or a computer program, or any combination of systems, methods, and computer programs.

Other objects, features, and advantages of the various embodiments of the present invention will be explained in the following detailed description with reference to the appended drawings.

BRIEF DESCRIPTION OF THE DRAWINGS

The present invention is described in detail below with reference to the attached drawing figures, wherein.

Reference will hereinafter be made to the drawings in which similar elements in different drawings bear the same reference numerals.

DETAILED DESCRIPTION

In the following detailed description, certain preferred embodiments are described as illustrations of the invention in a specific application, network, or computer environment in order to provide a thorough understanding of the present invention. Those methods, procedures, components, or functions which are commonly known to persons of ordinary skill in the field of the invention are not described in detail as not to unnecessarily obscure a concise description of the present invention. Certain specific embodiments or examples are given for purposes of illustration only, and it will be recognized by one skilled in the art that the present invention may be practiced in other analogous applications or environments and/or with other analogous or equivalent variations of the illustrative embodiments.

Some portions of the detailed description which follows are presented in terms of procedures, steps, logic blocks, processing, and other symbolic representations of operations within a computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present invention, discussions utilizing terms such as "processing" or "computing" or "translating" or "calculating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system, which may be one of any type having suitable computing resources and configured to fetch, decode, and execute computer instructions. Aspects of the present invention are also discussed with respect to an Internet system including electronic devices and servers coupled together within the Internet platform, but it may be similarly implemented on any other type of extended network system including wireless data or digital phone networks. Although a variety of different computer systems can be used with the present invention, an exemplary computer system is shown and described in the preferred embodiments. As used herein, the term exemplary indicates an example and not necessarily an ideal.

The invention may be implemented as hardware, software, firmware, or combinations thereof. Prior to describing the details of the invention, an overview of the invention, as well as some contemplated environments will be described.

In an exemplary embodiment, it is contemplated that the invention be implemented as a computer-implemented process for use in conjunction with a web browser operating on a computer connected to the Internet. The web browser preferably possesses a "main screen window," which is a window in which a user is performing current browsing activities. Although described in conjunction with a web browser window, the invention may be associated with any computer or system that provides web browsing functionality or any other type of related content browsing functionality.

It is contemplated that the computer implemented methods and systems disclosed in this specification provide many of the services described in this specification, including, without limitation, web searching, display of visual elements, accepting user input and other functions. These different functionalities may be performed by processes running on computers or devices remote from each other. Thus it is contemplated that, for example, display functionality is controlled by a program physically located on a user's computer, while search functionality is controlled by a program physically located on a computer remote from a user's computer, such as a server. Other configurations are of course possible.

Figure 6:
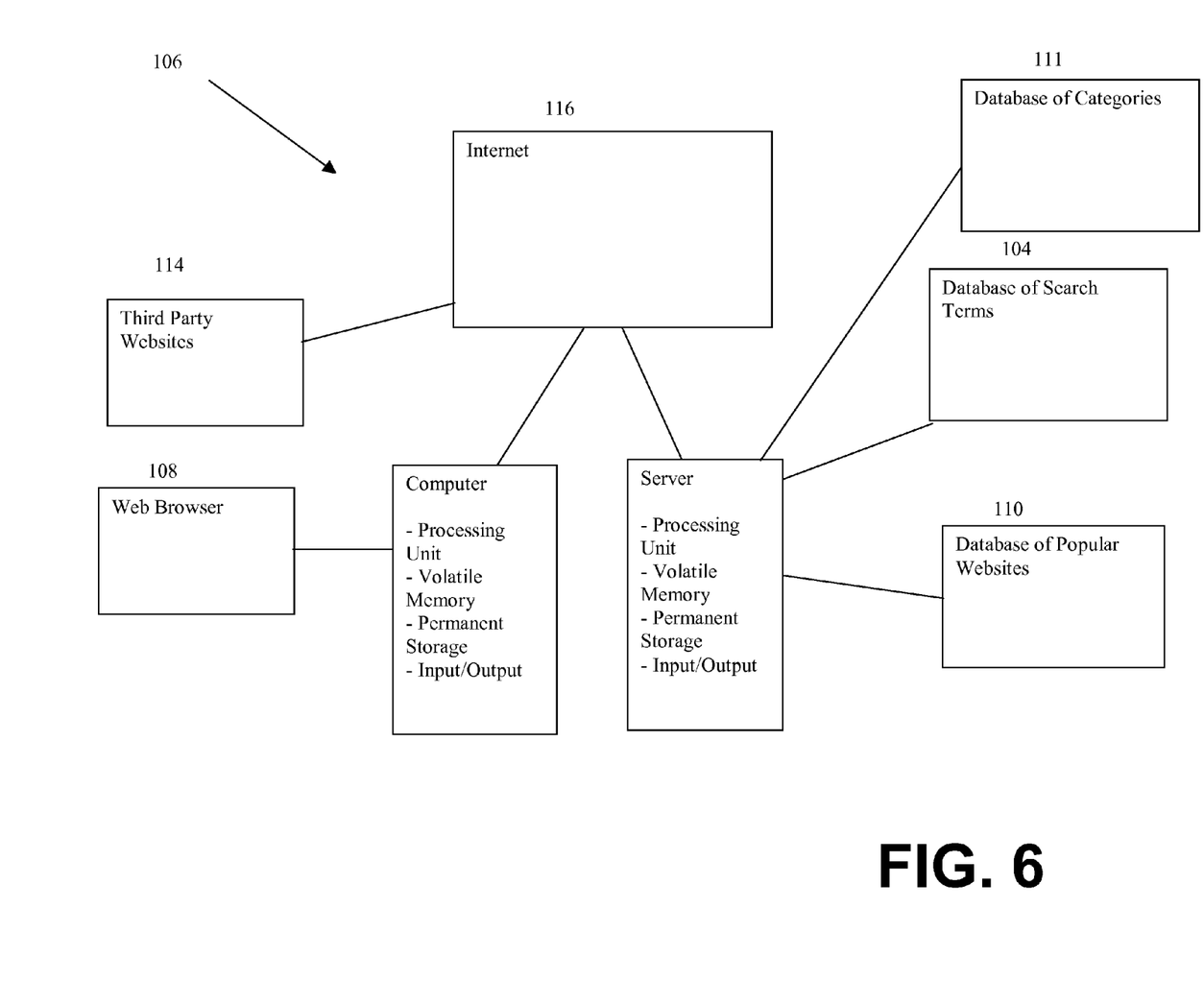
FIG. 6 is a block diagram of a computer-implemented system which is the subject of the present disclosure.

FIG. 6 is a block diagram depicting an exemplary system on which the teachings of this disclosure can be implemented. The computer system shown includes at least one processing unit, memory such as volatile and/or non-volatile memory, permanent storage such as hard disks and optical drives, and input/output connections. The system also preferably has input/output devices such as keyboard, mouse and computer screen.

The system further includes one or more servers, connected to the internet, and one or more user computers, also connected to the internet. Preferably the servers possess components such as a processing unit, memory, permanent storage, input/output devices, and connection devices for connecting to other devices and to the internet.

It is contemplated that this system be used in conjunction with a web browser, which is known in the art, and which allows a user to view a web page by entering a "uniform resource locator" (URL). Such web browsers usually comprise a URL bar, into which a user can enter a URL, and a main window which displays the web page the user requests.

Exemplary embodiments of the invention will now be described. These embodiments are provided to illustrate aspects of the invention and should not be construed as limiting the scope of the invention. It should be recognized that these preferred embodiments may be modified using the principles set forth herein, including, without limitation, addition and removal of the elements listed.

It is contemplated that the invention make use of different databases, including a database of search terms 104, a database of popular websites 110, and a database of categories 111. These databases store information such as popular search terms and popular websites. "Popularity" may be determined using statistical or analytical data based on historical activity, or through other appropriate methods. These databases will be described in further detail below.

Figure 1:
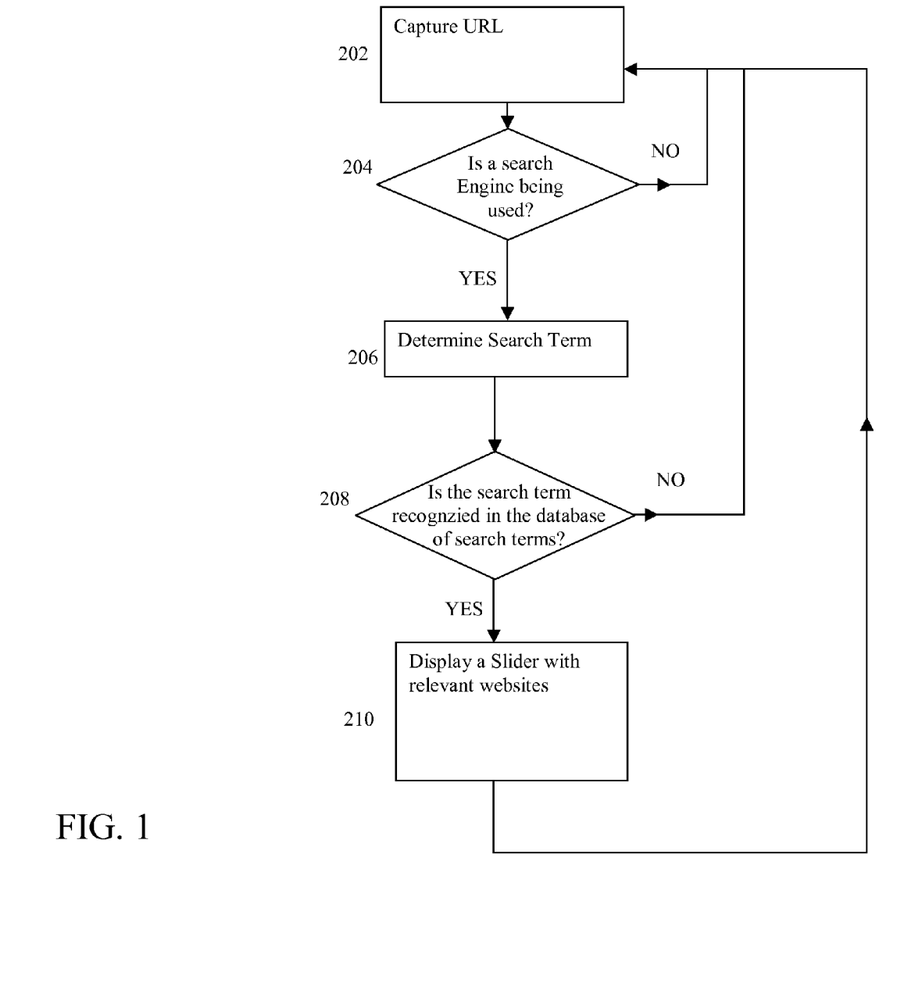
FIG. 1 is a flow chart depicting operation of a computer-implemented method in a first preferred embodiment.
Figure 4:
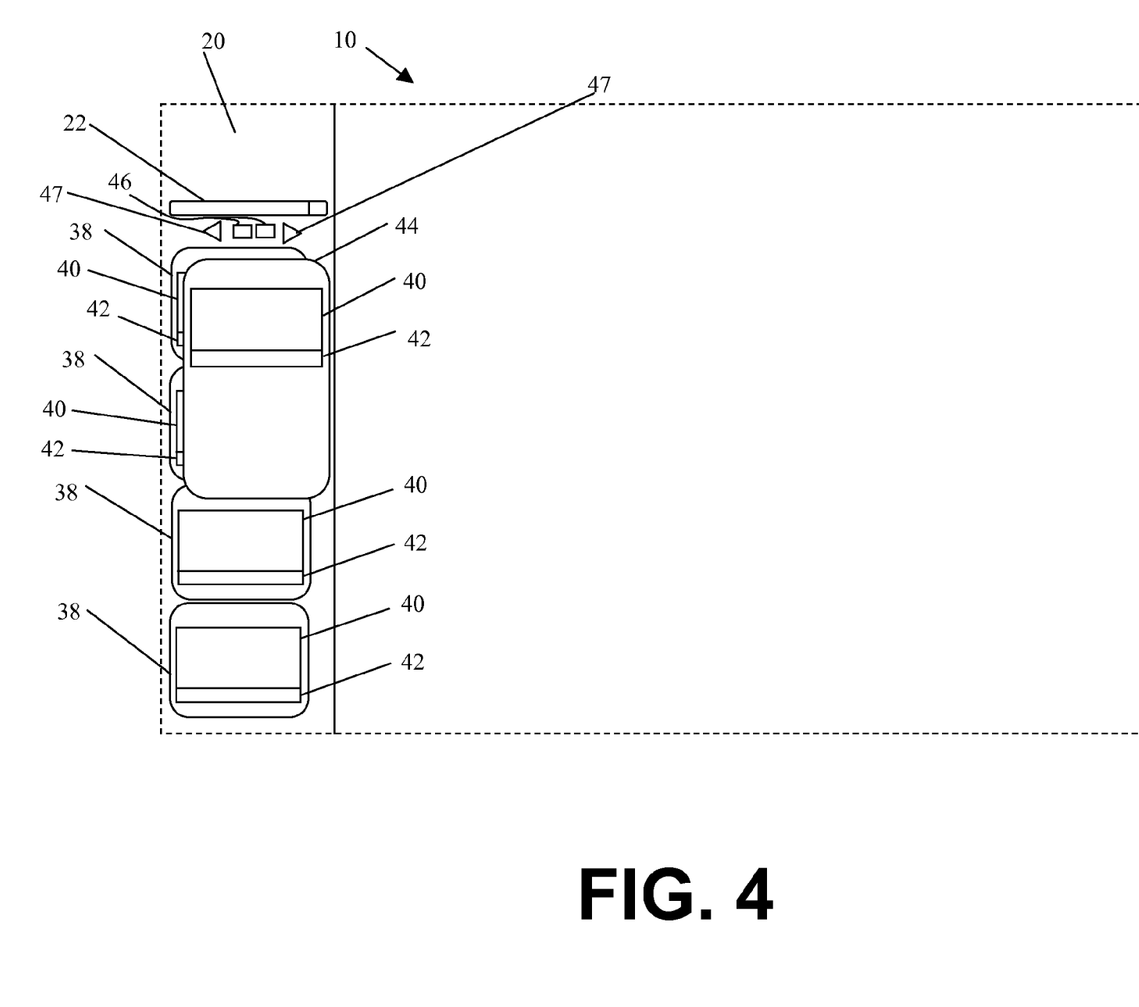
FIG. 4 depicts a first example of a screen shot displayed by a computer-implemented method.

Referring now to FIGS. 1 and 4, a first preferred embodiment of a computer-implemented process provides web browsing assistance while a user is viewing internet web pages on a computer. A slider 20 is displayed when a user provides a search query to a third party search engine. A slider 20 is a display element which can assist a user browsing the internet to view and/or browse to content which may be relevant to the user's current browsing activities. The slider is preferably displayed as a window frame within a web browser, and for visual effect "slides" off of and onto the screen by progressively moving from one position to another. The slider need not be located directly within a browser window, and may be displayed in a separate window. Additionally, although the slider is described and depicted as being on the left side of the screen, it is contemplated that the slider may be found at any location on the screen. The slider 20 may display a list of websites relevant to the query entered by the user. This list may be provided from a database of search terms 104, which is a database containing a list of popular search terms, and associates one or more "popular" websites with each of the multiple search terms.

The database of popular search terms 104 is used to store many of the most often requested search terms. Each of these search terms will be associated with at least one website, and preferably many more than one. These websites represent some of the most popular websites on the internet that are related to the search terms with which they are associated. Thus, a search term "books" might be associated with www.amazon.com and www.barnesandnoble.com, among others. The system 106 will keep track of the "popularity" of each associated website, in relation to each search term. Popularity can be assigned through different methods, including using statistical or analytical data, or manually, or a combination of these methods. For example, the system 106 might store the fact that www.amazon.com is the #1 most popular website for the search term "books", while www.barnesandnoble.com is the #2 most popular website for the search term "books." Further, different search terms may be associated with some of the same websites, and those associated websites may have different indicators of popularity for different search terms. So for example, while "books" might indicate that www.amazon.com is #1, "online shopping" might indicate that www.amazon.com is #10.

To determine whether a user is entering a query into a third party search engine, and if so, what that query is, the URL of the webpage currently being accessed by the user is captured in step 202. If the URL is captured by a browser add-on or other software module on a user's computer and the database of search terms 104 is stored at another location, such as a server, the captured URL can be sent to the server for determination of results from the database of search terms 104. Once the URL is captured, it is determined whether a search engine is being used in step 204. This is determined by looking at the domain name of the captured URL and comparing it to the domain names of known search engines. If a match exists, then in step 206, the search terms can be determined by using a lookup table that contains indicators for the location of search terms in known search engine URL's. For example, in Google, the search term always appears after the term "q=". In Yahoo, the search term always appears after the term "p=". In Microsoft Bing, the search term appears after the term "q=". It should be understood that these examples represent information obtainable at the time of filing of this application, and the methodologies and specific terms used by the listed search engines may change over time. It should therefore be recognized that the method used to determine the search query can be changed accordingly and as needed.

Another way of determining the search term, if the current URL does not contain a recognized search engine, is to analyze the URL in an ad hoc manner, using known search term indicators to determine the search term. Another way of determining the search term is to search for terms that are present both in the URL and in the current web page. Preferably, such terms would be looked for in the beginning of a web page, which is where search engines normally display search queries. Additionally, the HTML or other web page code can be analyzed for common search term locations, or common search term indicators.

In step 208, the system 106 will try to match the search query with a term in the database of popular search terms 104. The match can be an exact match or a broader, non-exact match. Non-exact matches can be made using certain tools, including but not limited to spell correction, grammar analysis, and the like.

Figure 8:
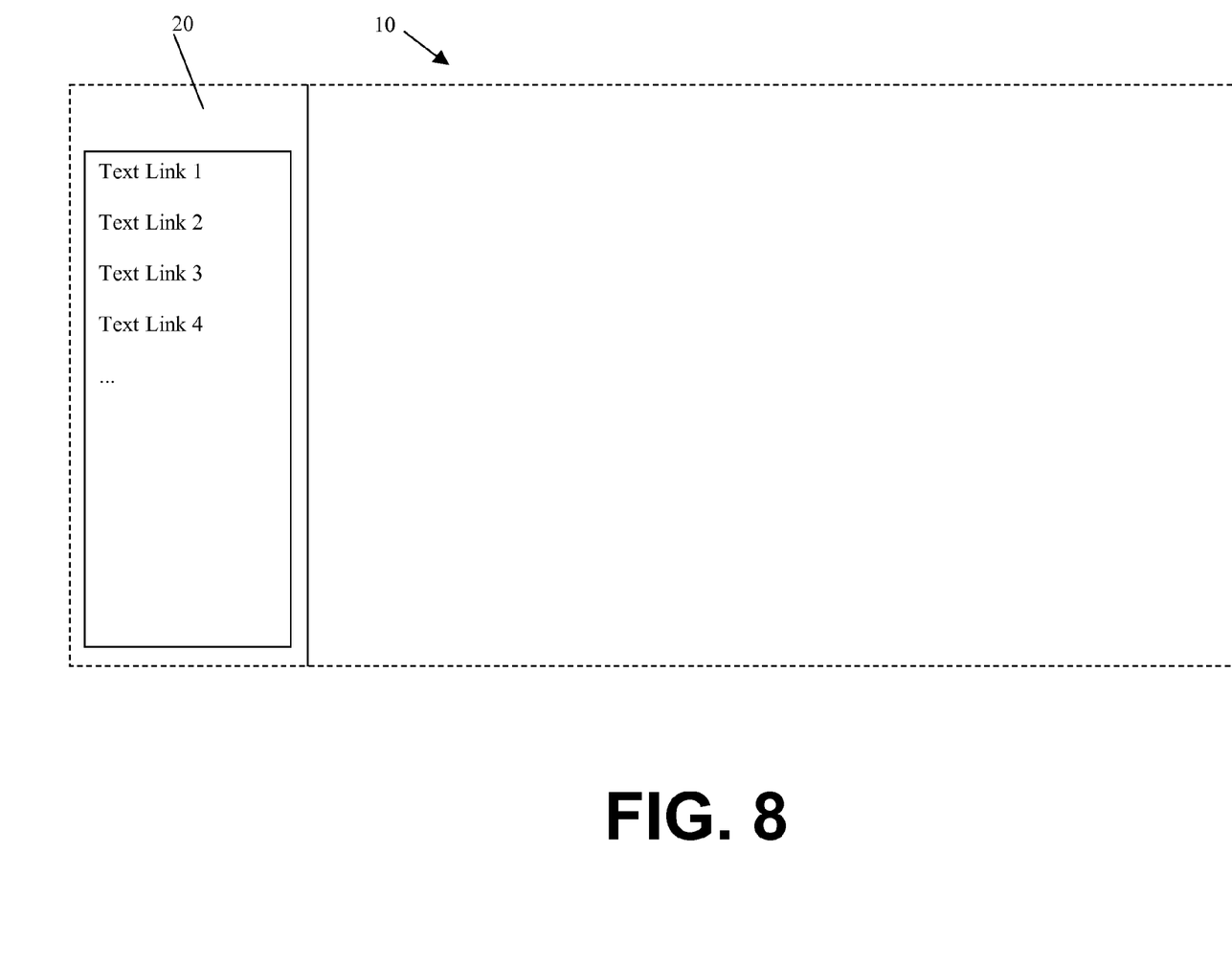
FIG. 8 depicts a third example of a screen shot displayed by a computer-implemented method.

If the system 106 produces a match, then in step 210, the slider 20 may display a list of websites relevant to the query. The list may be displayed as a series of website screenshot windows 38 arranged vertically within the slider 20, but any arrangement of website screenshot windows 38 can be made. The list may also be displayed in another manner, such as text links (as shown in FIG. 8), as icon links, or as any other element which will allow a user to browse to a different webpage. The list of websites relevant to the query are preferably displayed in order of "popularity", which is stored in the database of search terms 104. In other words, for a recognized search query, the system 106 will provide a list of relevant websites from the database 104 in order of the popularity as stored in that database. Preferably, these websites will be displayed within the slider 20 as website screenshot windows 38.

A website screenshot window 38 is a graphical element including a screenshot of a website, which helps a user visualize a web page. Website screenshot windows 38 may include other elements such as, without limitation, explanatory text and indicators of website popularity. It is contemplated that several of these windows 38 be displayed on a screen at one time, to allow a user to compare visual depictions of websites a user is thinking of browsing to. Preferably, when a user clicks on a website screenshot window 38, the user will be brought to the website to which the website screenshot window refers. These windows 38 may each contain one or more website screenshots 40, one or more rank number indicators 39 at the top left of the window 38, one or more website titles 41 to the right of the rank number indicators 39, and one or more category bars 42 at the bottom of the window 38, indicating a category name 43. Although a position has been listed for the elements of the website screenshot windows 38 (rank number indicators 39, website titles 41, category bars 42 and category names 43), those elements may be arranged within the website screenshot windows in any manner which presents the information to a user in a convenient way. While the website screenshot windows 38 preferably contain website screenshots 40, they may instead contain other graphics, such as an icon related to the website, images of other webpages related to the website, or other images that indicate to the user the content of the website.

A website screenshot 40 is preferably a thumbnail image of a website. The rank number indicator 39 preferably indicates the popularity of the website. Popularity of the website is usually determined within a particular category or within a set of search results. If the user is browsing websites by category, the rank will be within the category; if the user has conducted a search, the rank will be within those search results. The category name 43 within the category bar 42 is preferably stored in the search term database 104.

The system 106 will preferably display expanded website screenshot windows 44 when a user mouses over any of the website screenshot windows 38 at roughly the location of the website screenshot 40. The expanded website screenshot windows 44 will display the same website screenshot 40 but will also provide a more verbose description of the website, and may display other information related to the website. The mouseover operation can be performed on any website screenshot window and should activate when a user moves a mouse cursor over a website screenshot window 38.

The slider may initially display the websites deemed most relevant to the user's search query. The user can subsequently view additional website screenshot windows 38 through the use of list index boxes 46 or scroll buttons 47. Preferably, list index boxes 46 will be displayed both above and below the website screenshot windows 38. Below the bottom-most list index boxes 46, buttons providing additional functionality may be displayed. A button allowing the user to hide the slider may be displayed, as well as buttons allowing the user to browse to narrower and broader categories 28, 30. As the websites are preferably provided in order of popularity, the additional websites provided to the user will be of continually decreasing popularity.

Figure 2:
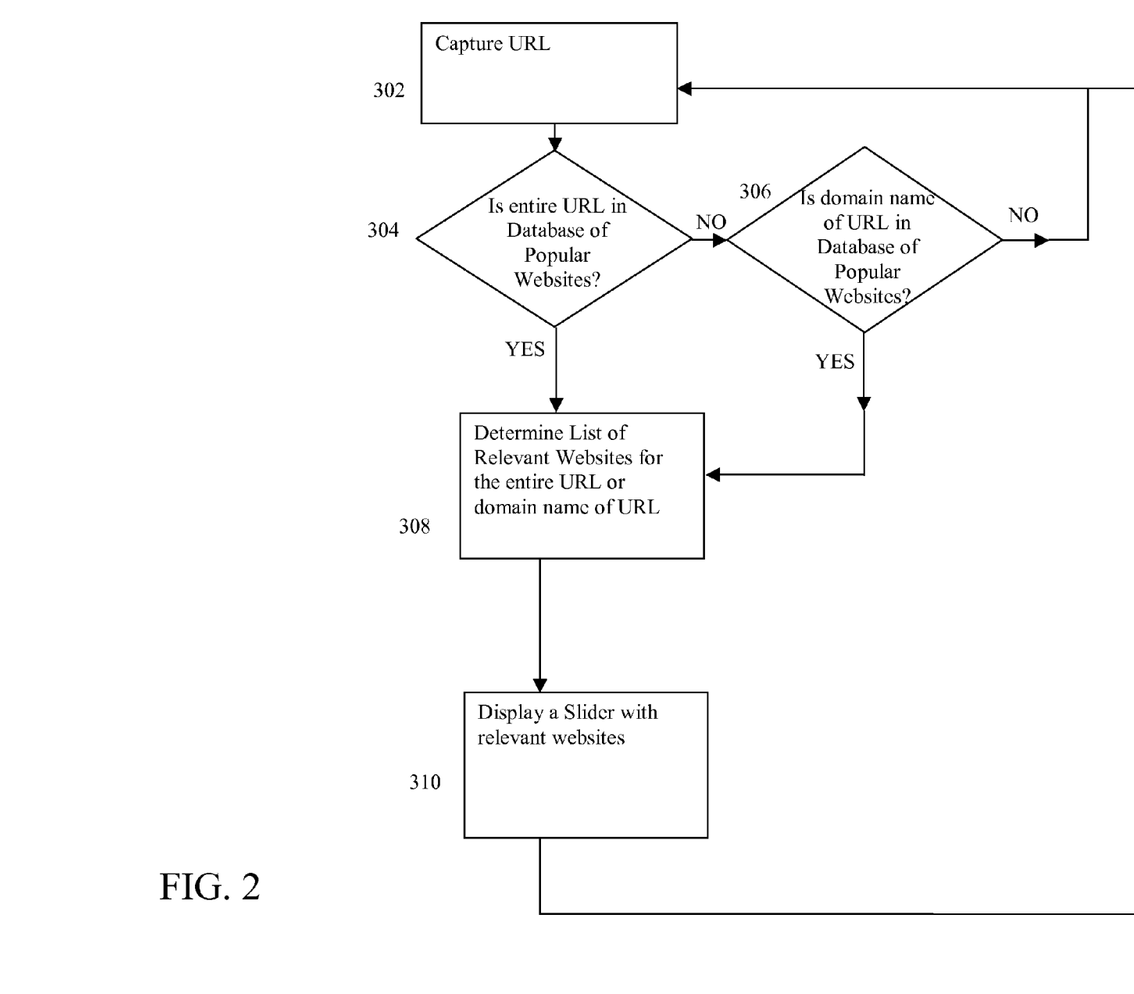
FIG. 2 is a flow chart depicting operation of a computer-implemented method in a second preferred embodiment.

Referring now to FIGS. 2 and 4, in a second preferred embodiment a user browses to a website, and if the website the user browses to is recognized, the system 106 may display a slider 20 with a list of related websites. The system may also present a list of related websites in another format, such as within a web browser toolbar.

To determine if the user has browsed to a recognized website, the URL of the current website may be captured in step 302 and compared to the database of popular websites 110. If the URL is captured by a browser add-on or other software module on a user's computer and the database of popular websites 110 is stored at another location, such as a server, the captured URL can be sent to the server for determination of results from the database of popular websites 110. The database of popular websites 110 is a database containing some of the most trafficked websites on the internet. If the URL of the current website matches a URL in the database of popular websites 110, then a list of related websites may be provided to the user. For this purpose, matching can be done first by trying to match the full URL with something in the database 110 in step 304. If no such match exists, instead just the domain name is compared for a match in step 306. Another possibility for matching is to first try to compare the full URL to the database of popular websites 110, then if no match exists, trying to take portions of the URL and compare those portions to the database of popular websites 110.

The database of popular websites 110 contains some of the most popular websites on the internet. Each of these websites may be linked to one or more websites that are deemed to be "related." Whether two websites are related can be determined by statistical or analytical data, or by manual determination. For example, "www.honda.com" may be stored as related to "www.ford.com." Popularity of each of these "related" websites, vis-a-vis the website to which they are linked may be stored as well. Thus, a website, such as "www.google.com" may be stored, and other similar websites such as "www.yahoo.com" and "www.bing.com" may be linked with "www.google.com." Further, "www.yahoo.com" may be the #1 ranked website related to "www.google.com," and "www.bing.com" may be the #2 ranked website related to "www.google.com." Additionally, the same website may be linked with more than one website in the database of popular websites 110, and may have a different popularity level for each different website. For example, "www.bing.com" may be the #2 ranked website related to "www.google.com" but may be the #1 ranked website related to "www.yahoo.com."

A list of related websites will be determined from the database of popular websites 110 in step 308, and then may be displayed in step 310, as website screenshot windows 38, which may be lined up vertically within the slider 20. The list can be organized by popularity, determined from the database 110. The system will preferably display expanded screenshot 44 windows when a user mouses over any of the website screenshot windows 38. Further, the system 106 preferably displays features which assist in navigation through the entire list of related websites, via arrows 47 and list index boxes 46 displayed within the slider 20. These are preferably displayed to the top or bottom, or both, of the list of related websites. Additionally, the slider may contain a search bar 22 to allow a user to perform a search query with the system.

Figure 3:
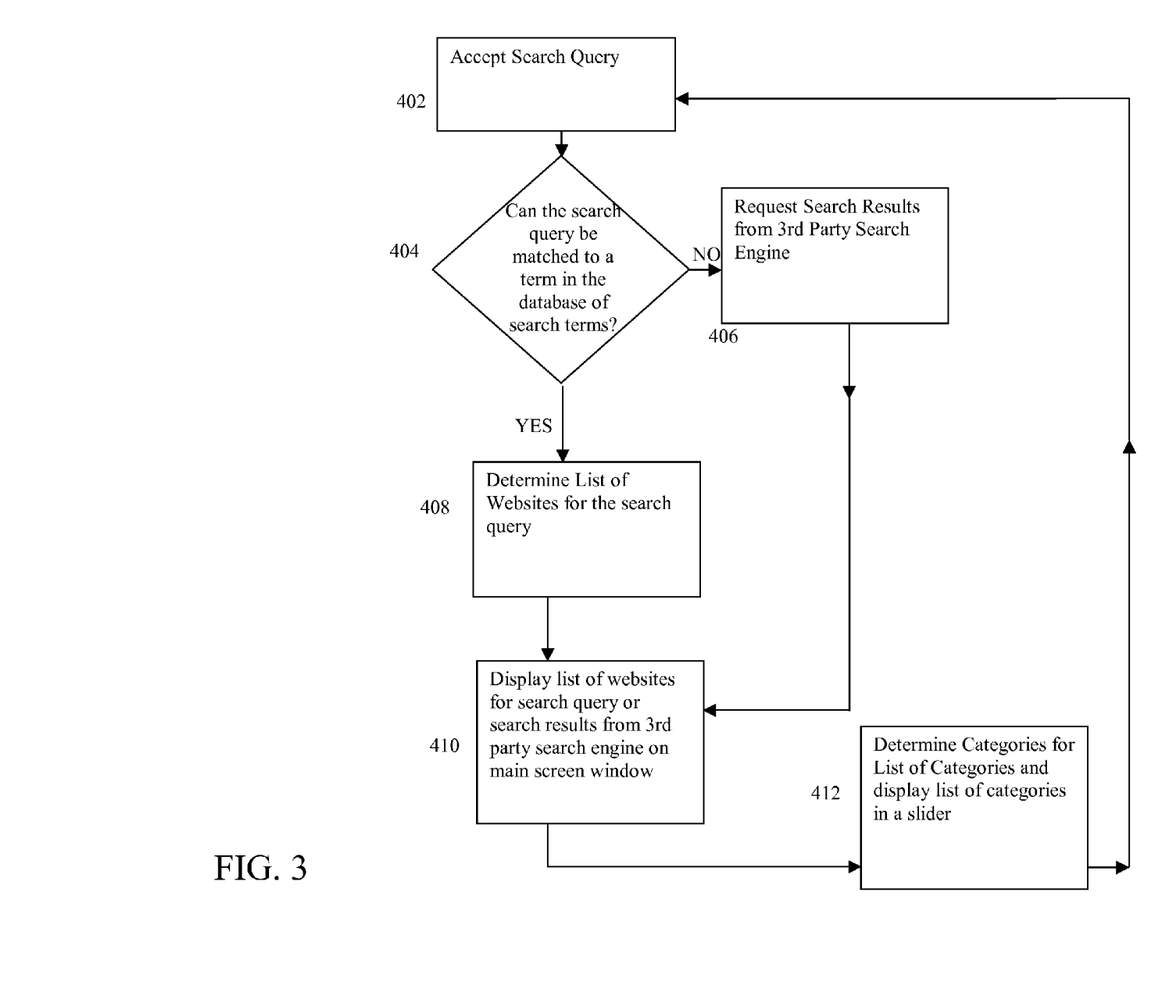
FIG. 3 is a flow chart depicting operation of a computer-implemented method in a third preferred embodiment.
Figure 5:
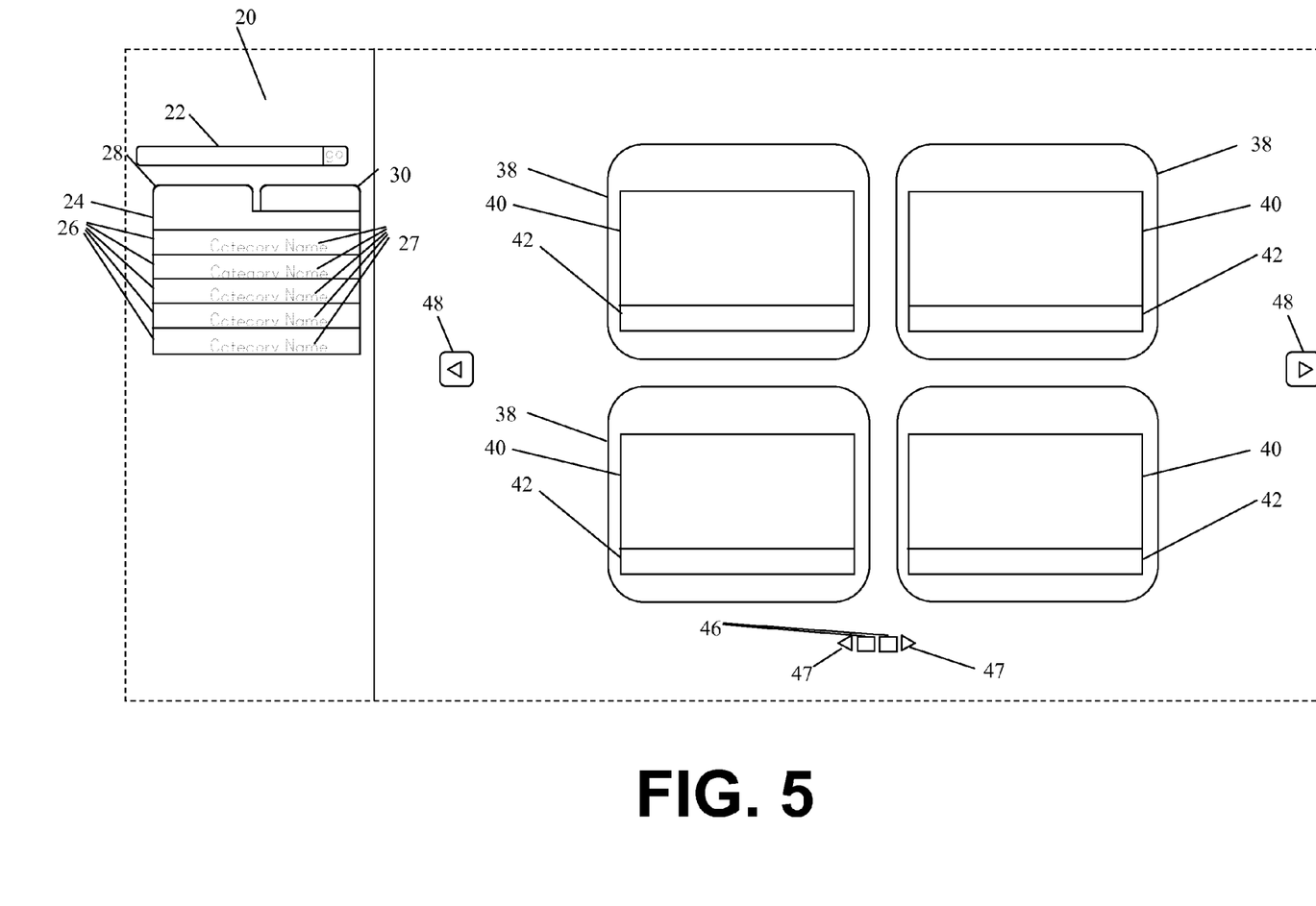
FIG. 5 depicts a second example of a screen shot displayed by a computer-implemented method.

Referring now to FIGS. 3 and 5, in a third preferred embodiment, the system 106 displays search results within a main browser window 10, with a slider 20 optionally displayed for further browsing assistance. Preferably, in this embodiment, the system 106 displays the search results when, in step 402, a user enters a query into a search bar 22 associated with the system 106, or provides a search query to the system 106 in some other manner (search functionality may be accessed by URL or by some other network protocol).

Search results may then be provided by the system 106. To do this, the system 106 will attempt to match the query to the database of search terms 104, in step 404. If no match exists, it may request search results from one or more third party websites, in step 406, such as third party search engines. In step 408, a list of websites for the search query will be determined. The results (forming a list of search results) from either the database of search terms 104 or from the third party website or websites will preferably be displayed within the main browser window 10 in step 410. The results from such a search may be presented to the user as a list of the most popular websites for the search performed. Preferably, the results are displayed as website screenshot windows 38 stacked vertically, and arranged in order of popularity (as indicated within the database of search terms 104), but may be presented in other formats, such as a square or rectangular arrangement of website screenshot windows 38, or by name, icon or in any other appropriate manner. List index boxes 46 and/or 47 will be provided so that a user can traverse the list of search results.

The list index boxes may include numbers indicating the position within the list of similar websites, and the group of similar websites currently being displayed. As an example, if the list of similar websites has 100 sites, and the user is currently viewing the first to fourth most popular websites, the list index boxes might show numbers "1", "2", and "3" which the first to fourth most popular websites, the fifth to eighth most popular websites, and the ninth to twelfth most popular websites, respectively.

The first page of results may present a small number, such as 4, of most popular websites, and traversing the list of search results further may cause the system 106 to display more results per page. This is to reflect that the most popular websites, which will be the first displayed, should receive the most attention and therefore will be displayed larger. Arrows 48 arranged to either side of the website screenshot windows 38 can allow a user to traverse the list.

To assist with browsing through the search results displayed within the main browser window 10, a list of categories 24 can be displayed within a slider 20, in step 412. The list of categories 24 is preferably displayed as a vertical list of text boxes 26, each displaying a category name 27. The list of categories 24 can appear when a user has provided a search query directly to the system 106 and is viewing a list of search results for that query, but may appear at other times as well. At the top of the list of categories 24 are preferably two tabs: an "expand" tab 28, which allows a user to browse broader category names, and a "narrow" tab 30, which allows a user to browse narrower category names. The list of categories preferably uses data from a database of categories 111 to display category names and to permit a user to browse through different categories.

Within the database of categories 111, one or more "categories" are stored, and each may be associated with one or more websites referenced by the database of popular search terms 104 and/or database of popular websites 110. The categories may also be associated with websites not present in either the database of popular search terms 104 or the database of popular websites 110. For example, a category such as "books" might exist in the database of categories 111 and might be associated with www.amazon.com, www.barnesandnoble.com, and www.borders.com, among other websites. Other categories, for example, "shopping" may also be associated with any or all of these websites. Popularity of each website within each category is stored in a similar manner to the way it is stored in the search and popular website databases 104, 106. In other words, each website within each category is assigned a rank within that category. The same website may be in multiple categories and have different ranks within each category.

The database of categories 111 may be organized in a hierarchy such that each category may point to one or more "broader" categories and one or more "narrower" categories. Thus, a category such as "books" may point to a broader category like "shopping" and a narrower category like "textbooks." Each category may point to multiple different categories.

It is contemplated that one or more of the search terms in the database of search terms 104 may each be linked with one or more of the categories in the database of categories 111.

When a search term is provided to the system 106, the system 106 will try to find the category from the database of categories 111, which is linked with that search term. If such a category is found, then the list of categories 24 can display categories that are either narrower or broader (depending on what setting the user has chosen or on the default setting, which is preferably narrower) than the category that was found. If a user clicks on any of the categories displayed in the list of categories 24, then the user will be presented with categories either narrower or broader than the clicked category.

While browsing in certain categories, the list of categories 24 may allow a user to view a narrower list of pop-up categories 32, containing pop-up category names 36. The pop-up list 32 preferably appears when a user mouses over a category name 27 in the list of categories 24. The pop-up list 32 displays a list of categories which are narrower than the moused over category name 27. The pop-up list of categories 32 may provide scroll buttons 34 to allow browsing within the pop-up list 32.

Each entry in any of the databases (popular search terms 104, popular websites 110 and categories 111) may also be associated with other information, such as geographical location, or any other type of information required.

The list of categories may be displayed as multiple text boxes, stacked vertically. Each of the text boxes may contain the name of a category. The list may also display check boxes to allow a user to select which categories the search results are chosen from, and also a text box to allow a user to type in specific information such as geographic location.

In any embodiment or combination thereof, a search bar 22 may be provided to allow a user to perform searches from within the slider 20 or other location. The searches may be conducted by matching the term entered to the search terms within the database of search terms 104, using a third party search engine, or using other known search methodology. Preferably, if a match exists between the search term and the database of search terms 104, search results will be provided by the system. Otherwise, a search will be performed at a third party search engine, and results from that engine will be provided to the user.

Figure 7:
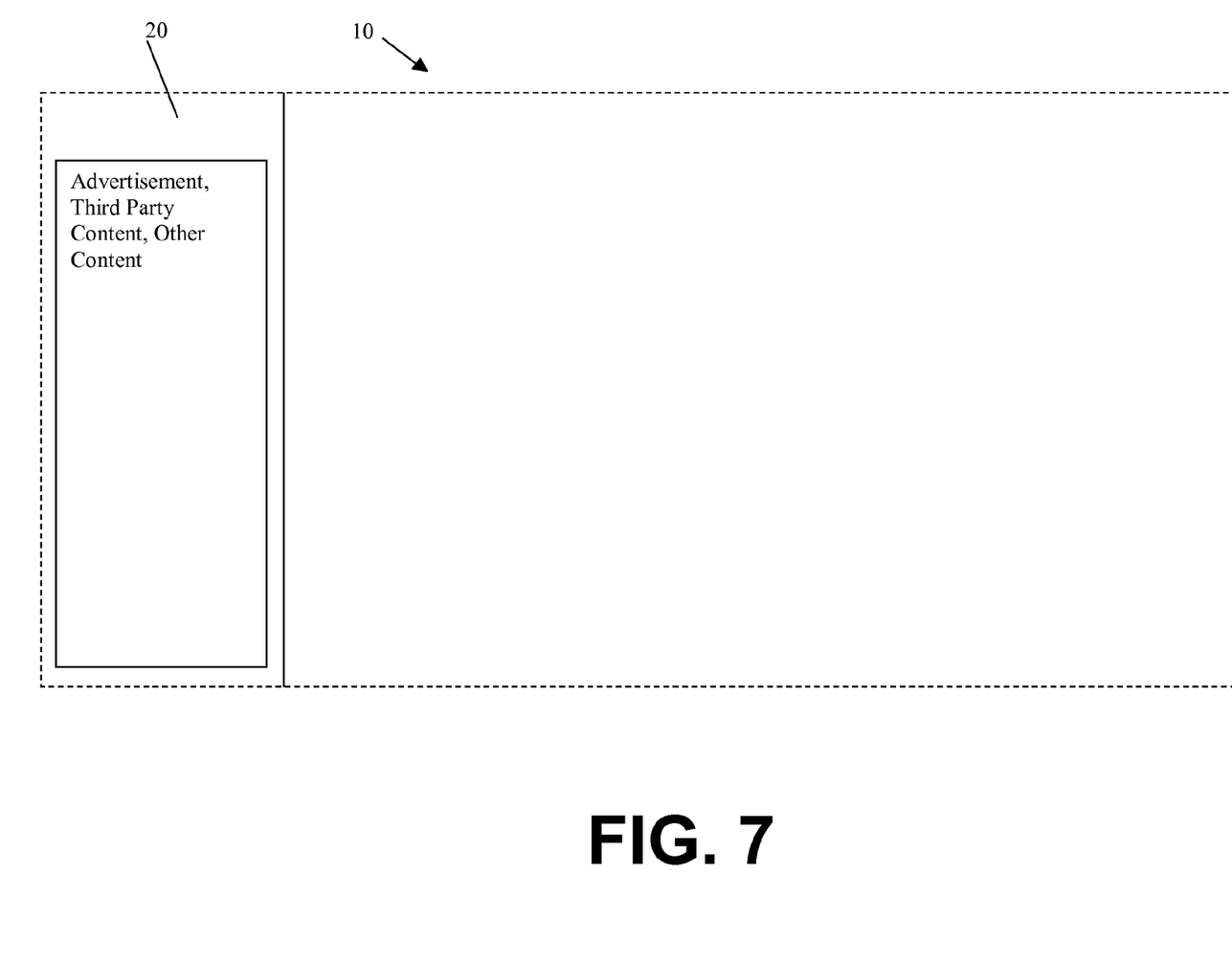
FIG. 7 depicts a third example of a screen shot displayed by a computer-implemented method.

Aside from what is described above, the slider may also display advertisements related to the search query or the content the user is viewing, other content pre-determined to be related to the content the user is currently viewing, or content chosen by third parties not associated with the system 106, as can be seen in FIG. 7. The slider may display a combination of these or any other type of content appropriate for the slider. Such content may be retrieved in real time or may be pre-determined and stored. Preferences such as language, content type, filtering, and information sources, can all be used to display and/or alter content within the slider.

Just as the slider will appear when certain conditions are met (listed above), the slider may disappear when those conditions are not met. When a person browses away from a search engine or from another recognized website from the database of popular websites 110, for example, the system 106 may cause the slider 20 to disappear.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments disclosed as the best mode contemplated for carrying out this invention.

The invention claimed is:

1. A computer-implemented process for displaying content relevant to a user's browsing activities, comprising:
   maintaining a database of search terms, a database of popular websites and a database of website categories;
   associating one or more of the popular websites with each of the search terms and with each of the website categories;
   tracking a popularity ranking of each of the popular websites in relation to each of the search terms and each of the categories;
   monitoring the user's browsing activities for a triggering event to display content relevant to the user's browsing activities;
   accepting a search term input;
   comparing the search term input to the database of search terms;
   if there is a match between the search term input and the database of search terms, determining a list of relevant websites from the one or more popular websites associated with the search term input;
   displaying a window frame in a main program window;
   displaying a series of website screenshot windows within said window frame, said series of website screenshot windows displaying websites in the list of relevant websites in order of the popularity ranking in relation to the search term input, each of said website screenshot windows displaying a screenshot of one of the websites in the list of relevant websites, the popularity ranking of the one of the websites, a title of the one of the websites, and a category associated with the one of the websites.

2. The process of claim 1, wherein:
comparing the search term input to the database of search terms comprises locating an approximate match to the search term within the database of search terms.

3. The process of claim 1, wherein:
accepting a search term input comprises capturing a search term from a web browser URL bar or entered into a search bar associated with the user's browser.

4. The process of claim 1, wherein:
the window frame is slidable off of and onto the main program window.

5. The process of claim 1, wherein:
when a user mouses over a website screenshot window, an expanded website screenshot window is displayed.

6. The process of claim 5, wherein:
the expanded website screenshot window displays substantially all of the content of the website screenshot window, and further displays a verbose description of the website depicted in the website screenshot window.

7. The process of claim 1, further comprising:
sending the list of relevant websites;
and causing the user's computer to display websites in the list of relevant websites.

8. The process of claim 1, further comprising:
providing a web browser add-on operable on the user's computer having functionality for determining a search term input from a browser on the user's computer.

9. The process of claim 1, wherein the triggering event is selected from the group consisting of the user entering a search query into a third party search engine, the user browsing to a recognized web page, or the user requesting search results from a system implementing the process.

10. A computer-implemented process for displaying content relevant to a user's browsing activities, comprising:
maintaining a database of search terms, a database of popular websites and a database of website categories;
associating one or more of the popular websites with each of the search terms and with each of the website categories;
linking related websites in the database of popular websites to form groups of related websites;
tracking a popularity ranking of each of the popular websites in relation to the related websites in the groups of related websites;
monitoring the user's browsing activities for a triggering event to display content relevant to the user's browsing activities;
accepting a URL of a currently viewed website;
comparing the URL to the database of popular websites;
if there is a match between the URL and the database of popular websites, determining a list of relevant websites comprising one of the groups of related websites;
displaying a window frame in the main program window;
displaying a series of website screenshot windows within said window frame, said series of website screenshot windows displaying websites in the list of relevant websites in order of the popularity ranking of the relevant websites, each of said website screenshot windows displaying a screenshot of one of the websites in the list of relevant websites, the popularity ranking of the one of the websites, a title of the one of the websites, and a category associated with the one of the websites.

11. The process of claim 10, wherein:
said comparing comprises determining whether the entire URL can be exactly matched to an entry in the database of popular websites.

12. The process of claim 11, wherein:
said comparing further comprises determining whether a domain name within the URL can be matched to an entry in the database of popular websites if the entire URL cannot be exactly matched.

13. The process of claim 10, further comprising:
displaying a search bar within the window frame.

14. The process of claim 10, wherein:
when a user mouses over a website screenshot window, an expanded website screenshot window is displayed.

15. The process of claim 10, wherein the triggering event is selected from the group consisting of the user entering a search query into a third party search engine, the user browsing to a recognized web page, or the user requesting search results from a system implementing the process.

16. The process of claim 10, wherein the window frame is slidable off of and onto the main program window.

17. A system for providing relevant content to a user browsing the internet, said system comprising:
one or more servers capable of connecting to a user computer through an internet connection and having a database of search terms, a database of popular websites and a database of website categories;
said one or more servers programmed to link related websites in the database of popular websites to form groups of related websites and to associate one or more of the popular websites with each of the search terms and with each of the website categories, and to track a popularity ranking of each of the popular websites in relation to the related websites in the groups of related websites and in relation to each of the search terms and each of the categories;
said one or more servers programmed to monitor browsing activities of the user for a triggering event and to receive a query for content relevant to the browsing activities of the user;
said one or more servers programmed to produce a list of websites relevant to said query, and cause a user computer to display the list of websites within a series of website screenshot windows in a window frame in a main program window, said series of website screenshot windows displaying websites in the list of websites in order of the popularity ranking in relation to the query, each of the website screenshot windows displaying a screenshot of one of the websites in the list of websites, the popularity of the one of the websites, a title of the one of the websites and a category associated with the one of the websites.

18. The system of claim 17, wherein the triggering event is selected from the group consisting of the user entering a search query into a third party search engine, the user browsing to a recognized web page, or the user requesting search results from a system implementing the process.

19. The system of claim 18, wherein:
said query is a search term; and
one or more of said servers are programmed to compare the search term to the database of search terms by locating an approximate match to the search term within the database of search terms.

20. The system of claim 18, wherein:
said query is a URL of a currently viewed website; and
one or more of said servers are programmed to compare the URL to the database of popular websites by determining whether the entire URL can be exactly matched to an entry in the database of popular websites and, if the entire URL cannot be exactly matched, determining whether a domain name within the URL can be matched to an entry in the database of popular websites.

* * * * *